United States Patent [19]

Walton

[11] 4,033,301

[45] July 5, 1977

[54] FLUID DISTRIBUTOR LOGIC

[75] Inventor: Erlen B. Walton, Farmington Hills, Mich.

[73] Assignee: Eaton Corporation, Cleveland, Ohio

[22] Filed: July 10, 1975

[21] Appl. No.: 594,832

[52] U.S. Cl. ...................... 123/32 G; 123/139 AW; 123/139 E; 123/139 R; 137/624.13; 137/624.15; 137/625.69

[51] Int. Cl.[2] ........................................ F16K 13/04

[58] Field of Search ......... 123/32 F, 32 G, 139 AB, 123/139 AF, 139 AD, 139 E, 139 R, 137, 139 AW, 140 A; 137/624.13, 624.15, 625.25, 625.69; 222/70, 501

[56] References Cited

UNITED STATES PATENTS

| | | | |
|---|---|---|---|
| 2,077,259 | 4/1937 | Planiol | 123/139 E |
| 3,505,984 | 4/1970 | Mansfield | 123/139 R |
| 3,752,137 | 8/1973 | Kimberley | 123/32 G |
| 3,759,239 | 9/1973 | Regmeault et al. | 123/32 F |
| 3,797,469 | 3/1974 | Kobayashi et al. | 123/139 E |
| 3,827,832 | 8/1974 | Falpel et al. | 123/139 AD |
| 3,837,324 | 9/1974 | Links | 123/139 E |

FOREIGN PATENTS OR APPLICATIONS

| | | | |
|---|---|---|---|
| 2,044,841 | 3/1972 | Germany | 123/139 R |

*Primary Examiner*—Carroll B. Dority, Jr.
*Assistant Examiner*—Paul Devinsky
*Attorney, Agent, or Firm*—Teagno & Toddy

[57] ABSTRACT

A dual metering valve for a diesel engine pilot fuel injection system. The dual valve includes a pilot fuel metering valve, a main fuel metering valve, and a logic system. The pilot and main valves are of the spool type and each includes a solenoid for axially moving the spool from an unactuated position to an actuated position and a spring which returns the spool to an unactuated position when the solenoid is de-energized. The logic system controls the supply of unmetered fuel to a chamber in each spool and utilizes the position of the spools to provide the logic control. When the main spool is in its unactuated position it ports unmetered fuel to the pilot spool chamber; when the main spool is in its actuated position it blocks the supply of unmetered fuel to the pilot spool chamber. Pilot spool control is the reverse of the main spool control; i.e., when the pilot spool is in its unactuated position it blocks the supply of unmetered fuel to the chamber in the main spool; when the pilot spool is in its actuated position it ports unmetered fuel to the main spool chamber. The logic allows fuel metering whent he spools move from their unactuated positions to their actuated positions. The logic prevents fuel metering when the spools move from their actuated positions to their unactuated positions.

22 Claims, 6 Drawing Figures

FLUID DISTRIBUTOR LOGIC

BACKGROUND OF THE INVENTION

1. Field of the Invention

This invention relates to a pilot fuel injection valve for an internal combustion engine and more specifically to a logic system for controlling the availability of high pressure fuel in the metering sections of the valve.

2. Description of the Prior Art

The concept of pilot fuel injection is known in the prior art. U.S. patent application Ser. No. 403,308, filed Oct. 3, 1973, now abandoned and division thereof Ser. No. 689,391, filed May 24, 1976 and assigned to the assignee of this application, discloses a spool type, dual valve for metering pilot and main fuel charges to the cylinders of an engine. A mechanical fuel distributor controls the availability of unmetered high pressure fuel to the spools. The mechanical fuel distributor connects the metering portion of the spools to a source of unmetered high pressure fuel when the spools are moving from an unactuated position to an actuated position. The spools meter fuel while moving between the positions; no fuel is metered in either position. The mechanical fuel distributor then blocks the connection between the source and the spools to prevent the metering of a second fuel charge while the spools are being returned to their unactuated positions. The mechanical fuel distributor adds cost and complexity to the fuel injection system.

SUMMARY OF THE INVENTION

An object of this invention is to provide a fluid metering valve which reduces the cost and complexity of a fluid injection system.

Another object of this invention is to provide a logic system for controlling the availability of unmetered high pressure fluid to a metering valve of an injection system.

Another object of this invention is to provide such a logic system for a dual metering valve.

According to a feature of this invention the fluid metering valve includes first and second movable valving members disposed in a housing having a fluid inlet and a fluid outlet. The valving members are each movable between first and second positions. When the second valving member is in its first position, a logic section therein connects the first valving member to the inlet and a metering section in the first valving member meters fluid from the inlet to the outlet when it is moving from its first position to its second position. When the second valving member is in its second position the logic section blocks the connection between the inlet and the first valving member, thereby preventing fluid metering when the first valving member is returned to its first position.

According to another feature of the invention the fluid metering valve is a dual valve and the movable valving members each include a fluid metering section and a fluid logic section. The logic section of the second valving member connects the metering section of the first valving member to the inlet when the second valving member is in its first position, whereby the first valving member can meter fluid when it is moving from its first position to its second position. The logic section of the first valving member connects the metering section of the second valving to the inlet when the first valving member is in its second position, whereby the second valving member can meter fluid when it is moving from its first position to its second position. The logic sections of the valving members then allow return of the valving members to their first positions without additional fuel metering. The logic section of the first valving member blocks the connection to the metering section of the second valving member when the first member is in its first position, thereby preventing fluid metering when the second valving member is returned to its first position. The logic section of the second valving member blocks the connection to the metering section of the first valving member when the second valving is in its second position, thereby preventing fluid metering when the first valving member is returned to its first position.

BRIEF DESCRIPTION OF THE DRAWINGS

The preferred embodiment of the invention is shown in the accompanying drawings in which.

DESCRIPTION OF THE PREFERRED EMBODIMENT

Figure 1:
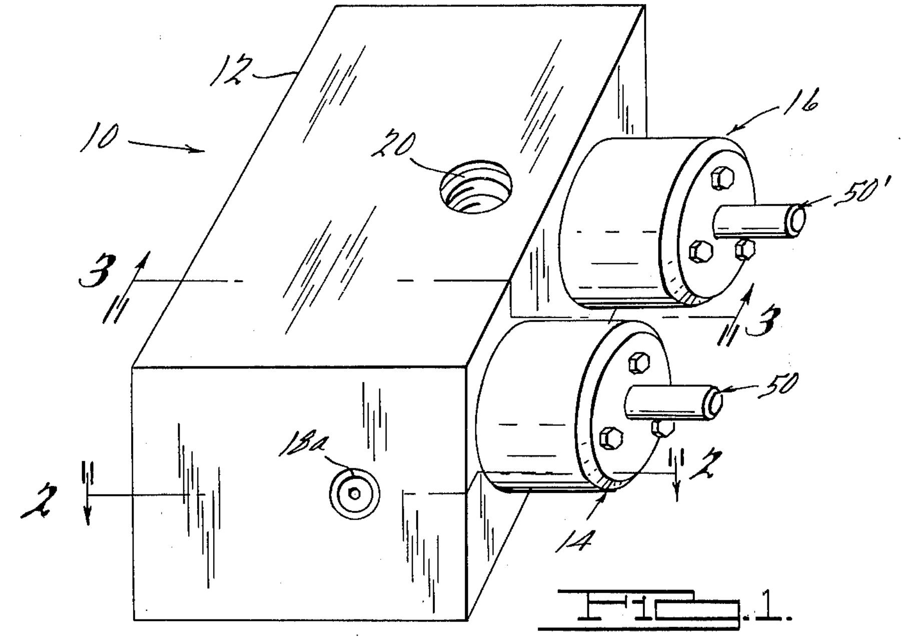
FIG. 1 is a schematic pictorial view of a dual metering valve.

FIG. 1 is a perspective view of a dual metering valve 10 having a housing 12 in which is disposed, in a parallel relationship, a main fuel metering valve 14 and a pilot fuel metering valve 16. Metering valves 14 and 16 include rotatable shafts 50 and 50' for varying the amount of fuel metered by the valves in proportion to throttle movement. Housing 12 has four port 22 (22 is shown only in FIG. 3). Valve 10 is adapted for installation in a pilot fuel injection system for a compression ignition engine. However, dual valve 10 may be used in any system requiring a valve having the capability of accurately metering pulses of fluid.

The dual metering valve 10 is adapted for installation in the pilot fuel injection systems disclosed in U.S. patent application Ser. No. 403,308, filed Oct. 3, 1973, and assigned to the assignee of this application. Application Ser. No. 403,308 is incorporated herein by reference. Dual valve 10 is particularly adapted for installation in the system of FIG. 1 of the referenced application. The manner in which dual valve 10 is installed in the system of FIG. 1 requires a brief explanation. In this explanation reference numerals of the referenced application will be prefixed by an R for purposes of clarity. The installation in the system of FIG. 1 is as follows: distributor R26 is dispensed with, a dual valve 10 is provided for each cylinder of the engine in lieu of dual valves **R28*a*, R28*b*, etc., inlet ports 18*a* and 18*b* are connected directly to accumulator R24, outlet port 20 is connected to injection nozzle R32, and shaft R42 is connected to shafts 50 and 50'** in any well known manner such as by a rack and pinion.

Figure 3:
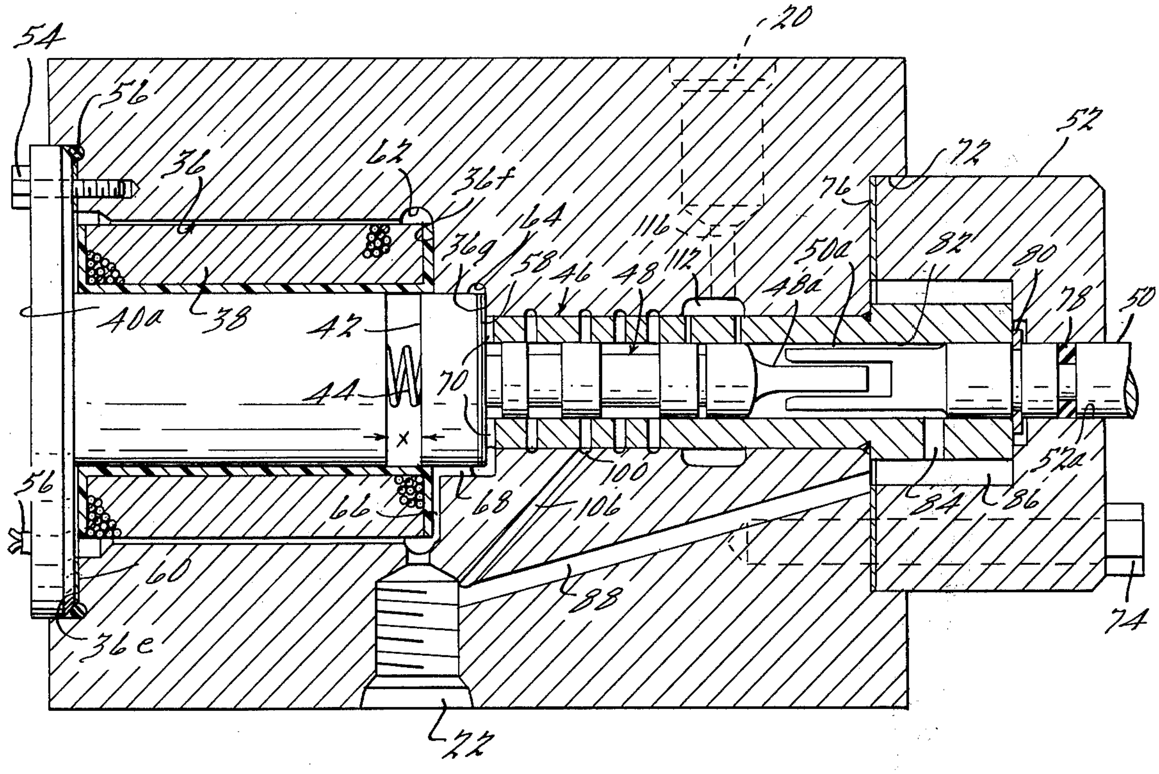
FIGS. 2 and 3 are sectional views of the dual valve in FIG. 1 looking in the direction of arrows 2 and 3, respectively.

The main and pilot fuel metering valves are solenoid actuated spool valves and each performs two functions: The pilot valve meters a pilot fuel charge to the engine cylinder via port 20 and controls the supply of unmetered high pressure fuel to the fuel metering portion of the main fuel metering valve. The main valve meters a main fuel charge to the engine cylinder via port 20 and controls the supply of unmetered high pressure fuel to the metering portion of the pilot fuel metering valve. Control of the unmetered high pressure fuel supply by each valve to the fuel metering portion of the other valve forms what is called herein, a fuel distributor logic or logic system. This system comprises a logic section in the pilot and main valving assemblies of the pilot and main metering valves and transfer passages in housing 12 which interconnect the valving assemblies. The structure for performing the metering and logic functions is best seen in FIGS. 2 and 3.

Figure 2:
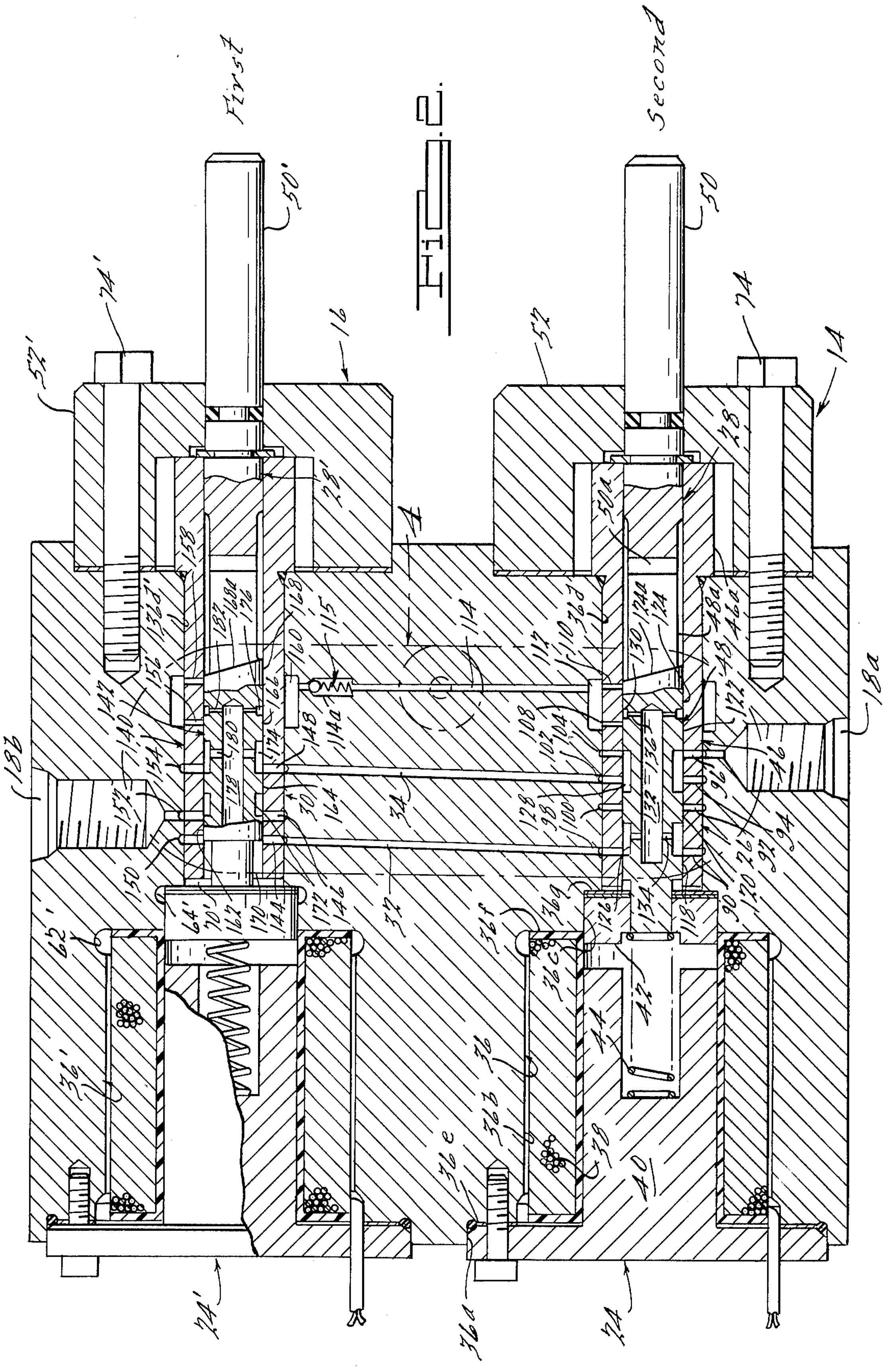

Looking first at FIG. 2, a main metering valve 14 includes a solenoid assembly 24, a main fuel valving assembly 26, and a spool rotating assembly 28. Main valving assembly 26 includes a fuel metering section and a fuel logic section, which sections are formed by passages in the valving assembly; the passages will be structurally described and then grouped according to their metering and logic function.

The metering valves 14 and 16 differ only with respect to passage arrangement in the logic sections and passage size in the metering sections of the valving assemblies. Hence, a detailed description of the solenoid and spool rotating assemblies of the main valve assembly 14 will suffice for both valves. Numerals used to identify portions of the solenoid and spool rotating assemblies in the main valve assembly will be given a prime to identify portions in the pilot valve assembly which are identical and necessary for description clarity. The valving assemblies of the pilot and main metering valves will be identified by different numerals.

Pilot valve 16 includes a solenoid assembly 24', a pilot fuel valving assembly 30, and a spool rotating assembly 28'. Pilot valving assembly 30 includes a fuel metering section and a fuel logic section, which sections are formed by passages in the valving assembly; these passages will be identified in the same manner as the corresponding passages in the main valving assembly.

The metering section in main valving assembly 26 communicates with the logic section in pilot valving assembly 30 via a transfer passage 32. The metering section in pilot valving assembly 30 communicates with the logic section in main valving assembly 26 via a transfer passage 34.

Solenoid assembly 24, main valving assembly 26, and spool rotating assembly 28 of the main metering valve 14 are disposed in a stepped bore 36 having bore portions 36*a*, 36*b*, 36*c* and 36*d*. The bore portions define shoulders 36*e*, 36*f*, and 36*g*. Solenoid assembly 24 is disposed in bore portions 36*a*, 36*b*, and 36*c* and includes a coil 38, an iron core 40, an armature 42, and a spring 44. Valving assembly 26 is disposed in bore portion 36*d* and includes a sleeve 46 and a spool or valving member 48. Spool rotating assembly 28 is partly disposed in bore portion 36*d* and includes a tang portion 48*a* formed on the right end of spool 48 and best seen in FIG. 3, a sleeve portion 46*a* which protrudes from the right end of bore portion 36*d*, the shaft 50, and a cup shaped cover 52. Shaft 50 includes a forked end 50*a* which slideably receives tang portion 48*a*, as best seen in FIG. 3.

Further features of the solenoid and spool rotating assembly, which are also the same for the main and pilot metering valves, will now be explained with references to the main valve shown in FIG. 3. Iron core 40 includes a flange portion 40*a* which is secured to housing 12 by a plurality of bolts 54, one of which is shown. An O-ring 56 seals bore 36 at the left end. Coil 38 is cylindrical and is encapsulated in a synthetic material which insulates the coil wires from fuel. A pair of lead wires 56 from the coil pass through a hole in flange 40*a*. Armature 42 may be securely fixed to the left end of spool 48 or formed therewith. The axial position of spool 48 in sleeve 46 is determined by a plurality of shims 58 which are disposed between armature 42 and shoulder 36*g*. Spool 48 is biased toward its unactuated or first position by spring 44. The air gap "X", between core 40 and armature 42, may be controlled by a second set of shims 60 which are disposed between flange portion 40*a* and shoulder 36*e*. The dimension of gap "X" is critical to valve operation, since spool 48 meters fuel only when it is moving. Hence, the velocity of the spool is directly related to the amount of fuel metered. This velocity is influenced by the initial electro magnetic force applied to the armature. The biasing force of spring 44 also influences the velocity of the spool. Hence, the biasing force must be closely controlled. The biasing force may be controlled by selecting springs within some defined limits or by providing an adjustment for varying the biasing force, such as an adjustment screw which could extend through iron core 40.

Leakage fuel from spool 48, which may get into the area occupied by the solenoid assembly, is drained into return port 22 by a pair of annular grooves 62 and 64, passages 66 and 68, and vertically extending notches 70 in the left end face of sleeve 46.

The cover 52 of spool rotating assembly 28 is received by a recess 72 in housing 12, is secured to the housing by a plurality of bolts 74 (one of which is shown in FIG. 2), and is sealed by a gasket 76. Shaft 50 is rotatably supported by a bore 52*a* in cover 52, is sealed by an O-ring 78, and is axially retained by a snap ring 80. Tang 48*a* and fork 50*a* are necked down to provide an annular passage 82 for communicating dumped fuel from the metering section of the main valving assembly to return port 22 via a passage 84, an annular chamber 86, and a passage 88. The right end of shaft 50, is adapted to be connected to an unshown throttle linkage system so that the amount of fuel metered can be controlled as a function of throttle position. On a multi-cylinder engine a single valve housing may contain a pilot valve and main valve for each cylinder. The pilot and main valve may then be arranged so that their shafts 50 are in parallel alignment. The parallel aligned shafts may then be rotated in unison by a rack and pinion gear system operated by the throttle.

The features of the main valving assembly 26 and the pilot valving assembly 30 will now be described with reference to FIG. 2. Sleeve 46 of valving assembly 26 is pressed into bore portion 36*d*. Sleeve 46 includes four sets of radially extending passages 90, 92, 94 and 96 which communicate, respectively, with four annular grooves 98, 100, 102 and 104 in bore portion 36*d*. Grooves 98 and 102 communicate, respectively with transfer passages 32 and 34. Groove 100 communicates with return port 22 via a passage 106, as shown in FIG. 3. Groove 104 communicates with inlet 18*a*. Sleeve 46 also includes a pair of fuel metering passages 108 and 110 which communicate with an annular groove 112. Groove 112 communicates with outlet port 20 via passages 114 and 116, as shown in FIGS. 2 and 3 together.

Spool 48 includes four lands 118, 120, 122 and 124, three annular grooves 126, 128 and 130, and a tubular chamber 132. Chamber 132 communicates with grooves 126 and 130, via two pairs of passages 134 and 136, respectively. The right shoulder 124a of land 124 is diagonally formed with respect to the axis of the spool to control the amount of fuel metered by the metering section in response to the rotational position of the spool. Spool 46 is shown in a position which will provide or meter a minimum amount of fuel, since diagonal shoulder 124a will start to uncover metering or dump passage 110 as groove 130 starts to traverse passage 108, thereby porting the high pressure fuel to return port 22 via annular passage 82, etc.

Grooves 98, 100, 102 and 104, passages 90, 92, 94 and 96, lands 118, 120 and 122, and grooves 126 and 128 form the logic section of main valving assembly 26. Passages 134, tubular chamber 132, passages 136, groove 130, passage 108, groove 112, passage 110, and diagonal shoulder 124a form the metering section of main valving assembly 26.

Pilot valving assembly 30 includes a sleeve 140 pressed into bore portion 36d' and a spool or valving member 142. Valving assembly 30 is functionally the same as valving assembly 26 and differs therefrom only with respect to passage sizes and arrangements. Several different passage arrangements are possible.

Sleeve 140 includes three sets of radially extending passages 144, 146 and 148 which communicate, respectively, with transfer passages 32 and 34. Groove 152 communicates with inlet passage 18b. Sleeve 140 also includes a pair of metering passages 156 and 158 which communicate with an annular groove 160. Groove 160 communicates with outlet port 20 via the passages 114 and 116, as shown in FIGS. 2 and 3 together. An end 114a of passage 114 includes a check valve 115 which allows free flow from annular groove 160 to the outlet port and prevents reverse flow.

Spool 142 includes four lands 162, 164, 166 and 168, four annular grooves 170, 172, 174 and 176, and a tubular chamber 178. Chamber 178 communicates with grooves 174 and 176, respectively, via two pairs of passages 180 and 182. The right shoulder 168a of land 168 is diagonally formed with respect to the axis of the spool to control the amount of pilot fuel metered in the same manner as the amount of metered fuel is controlled by the main valving member. Groove 170 communicates with return port 22 via a notch 70' grooves 64' and 62', and passages 66' and 68'. Passages 66' and 68' are not shown in FIG. 2, but have the same positional relationship as their counterparts for the main valve, as shown in FIG. 3.

Grooves 150, 152, and 154, passages 144, 146 and 148, lands 162, 164, and 166, grooves 170, 172 and 174 form the logic section of pilot valving assembly 30. Passages 180, tubular chamber 178, passages 182, groove 176, passages 156, groove 160, passage 158, and diagonal shoulder 124a form the metering section of pilot valving assembly 30.

OPERATION

In a fuel injection system having one dual valve 10 per engine cylinder, the pilot and main metering valves are each actuated once per engine cycle. The pilot and main valves are normally actuated during the compression stroke. Actuation of the pilot metering valve precedes actuation of the main metering valve by some number of crankshaft degrees, for example 40°. The number of degrees may be varied as a function of engine operating conditions, such as rpm and throttle position. Systems for actuating the valves as a function of these conditions are well known in the art.

For purposes of explanation the spool of each metering valve will be described with respect to its static or dynamic axial position in the sleeve of each metering valve. When the spools are static and fully to the right they are in their first or unactuated positions. When the spools are static and fully to the left they are in their second or actuated positions. When the spools are dynamic and moving to the left they are in the actuation strokes. When the spools are dynamic and moving to the right they are in the deactuation strokes. The logic system uses the logic section of one valving assembly to control the pressurizing and venting of the metering sections in the other valving assembly when the spools are in their static position.

Figure 4:
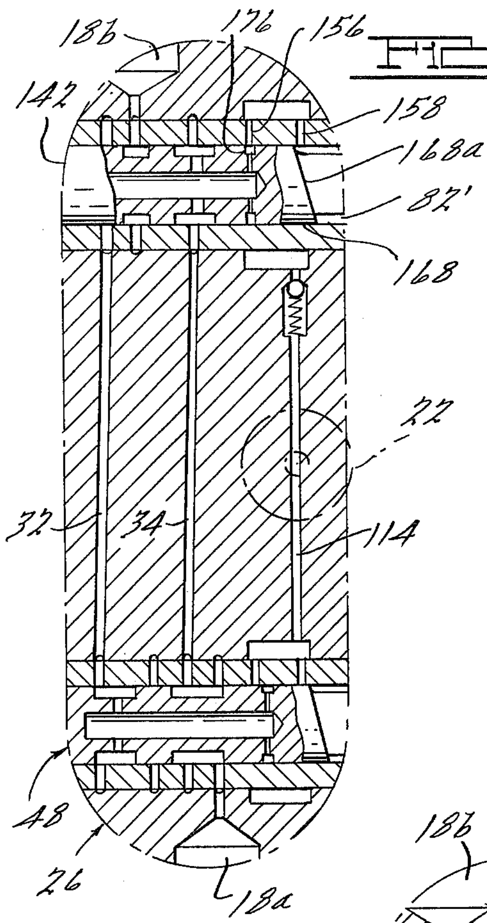
FIGS. 4, 4A and 4B are views showing various positions of the valving members of FIG. 2.

When spool 48 of main valving assembly 26 is in its unactuated position, i.e., to the right as shown in FIG. 2, groove 128 of the logic section connects the pilot metering section with unmetered high pressure fuel at inlet portion 18a via groove 104, passage 96, groove 128, passages 94, groove 102, transfer passage 34, groove 154, passage 148, and groove 174; in this spool position land 120 of the logic section blocks passages 92 and prevents venting of the pilot metering section. Hence, fuel may be metered by the pilot metering section, when spool 142 is being moved to the left. FIG. 4 shows spool 142 during its actuation stroke with groove 176 registered with passage 156. However, no fuel is being delivered to outlet port 20, since land 168 has already uncovered passage 158 due to the rotational position of diagonal shoulder 68a, thereby porting the pressure fuel to return port 22 via annular passage 82', etc.

Figure 4A:
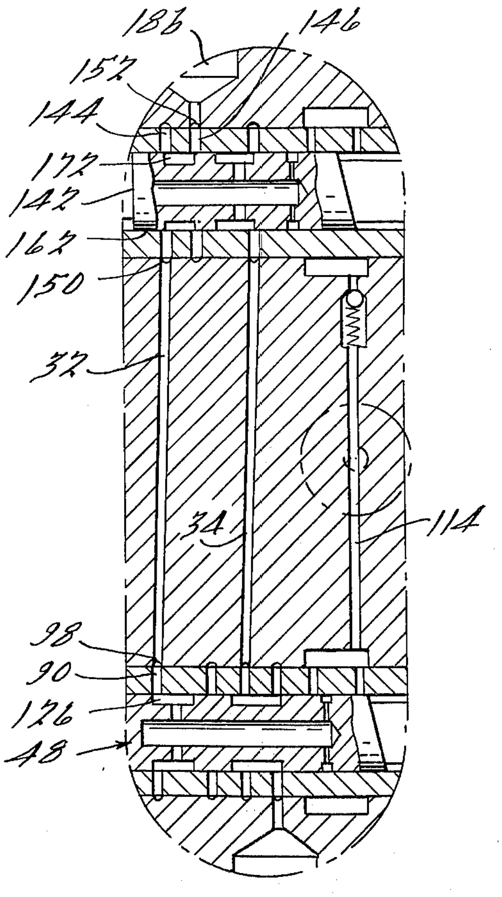

Spool 142 is shown in its actuated position in FIG. 4A, i.e., the spool is to the left. When in this position, groove 172 of the logic section connects the main metering section with unmetered high pressure fuel at inlet 18b via grooves 152, passages 146, groove 172, passages 144, groove 150, transfer passage 32, groove 98, passages 90, and groove 126; in this position land 162 of the logic section prevents venting of the main metering section. Hence, fuel may be metered by the main metering section when spool 48 is moved to the left.

Figure 4B:
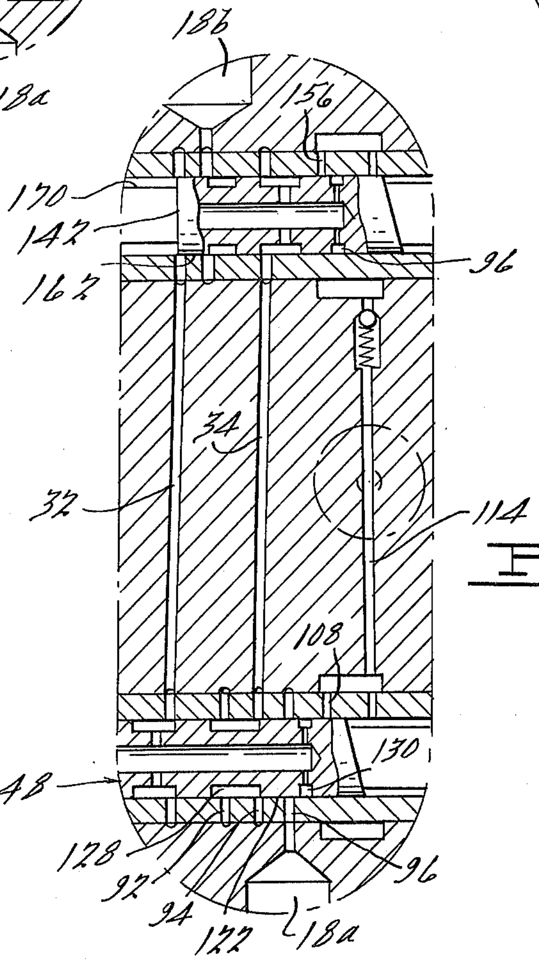

Spool 48 is shown in its actuated position in FIG. 4B, i.e., the spool is to the left. When in this position land 122 covers passages 92 and groove 128 communicates passages 96 with passages 94 thereby, respectively, blocking fuel communication between inlet port 18a and the pilot metering section and venting the pilot metering section to return 22. Hence, spool 142 may be returned to its inactivated position without fuel metering as groove 176 traverses passages 158. When spool 142 is in its unactuated position, as shown in FIG. 4B, land 162 prevents fuel communication between inlet port 18b and the pilot metering section and groove 170 vents the main metering section to return via notches 70', groove 64', etc., as shown in FIG. 2. Hence, spool 48 may be returned to its unactuated position without fuel metering as groove 130 traverses passages 108.

The preferred embodiment of the invention has been disclosed for illustrative purposes. Many variations and modifications of the preferred embodiment are believed to be within the spirit of the invention. The following claims are intended to cover the inventive portions of the preferred embodiment and variations and modifications within the spirit of the invention.

What is claimed is:

1. A fluid metering valve comprising:

a valve housing having a fluid inlet and a fluid outlet;

a first valving member in said housing and movable between first and second positions, said valving member including a fluid metering means blocked from communication with said outlet passage when said valving member is in said first and second positions and communicating with said outlet passage when said valving member is moving between said first and second positions, and a second valving member in said housing and movable between first and second positions, said second valving member including a fluid logic means for communicating said fluid inlet passage with said fluid metering means when in said first position and for blocking communication between said inlet passage and said fluid metering means when in said second position, whereby movement of said second valving member to said second position prevents fluid metering to said outlet when said first valving member is moving between said first and second positions.

2. A fluid metering valve comprising:

a valve housing having a fluid inlet and a fluid outlet;

first and second valving members in said housing and independently movable between first and second positions;

first and second fluid metering means defined by said first and second valving members, respectively, said metering means blocked from fluid communication with said fluid outlet when the respective valving member is in said first and second positions and each communicating with said fluid outlet when the respective valving member is moving between said first and second positions; and a first fluid logic means defined by said first valving member and movable between first and second positions corresponding to the first and second positions of said first valving member, said logic means operative to block fluid communication between said fluid inlet and said second fluid metering means when in said first position and operative to communicate said fluid inlet with said second fluid metering means when in said second position; and a second fluid logic means defined by said second valving member and movable between first and second positions corresponding to the first and second positions of said second valving member, said second logic means operative to communicate said inlet with said first fluid metering means when in said first position and operative to block communication therebetween when in said second position.

3. A fluid metering valve comprising:

housing means having a fluid inlet and a fluid outlet;

first and second valve assemblies disposed in said housing and each including a valving member movable between first and second positions, and metering means including a metering passage defined by the valving member and movable therewith for metering fluid from said inlet to said outlet when the valving member is moving between said first and second positions, said metering passage blocked from communication with said outlet when the valving member is in said first and second positions; and logic means for controlling fluid communication between said inlet and the metering passages defined by the first and second valving members of said first and second valve assemblies, respectively, said logic means including a first logic passage defined by said first valving member and movable therewith, said first valving member operative to block communication between said inlet and said metering passage defined by said second valving member when in said first position and communicate said inlet and metering passage via said logic passage when in said second position, and a second logic passage defined by said second valving member and movable therewith, said second valving member operative to communicate said inlet and said metering passage defined by said first valving member via said second logic passage when in said first position and block communication when in said second position.

4. The metering valve of claim 3, wherein said logic means further includes:

a first transfer passage communicating at one end with the metering passage defined by said second valving member and communicating at another end with said inlet passage via said first logic passage when said first valving member is in said second position and blocked from said last mentioned communicating when said first valving member is in said first position; and a second transfer passage communicating at one end with the metering passage defined by said first valving member and communicating at another end with said inlet passage via said second logic passage when said second valving member is in said first position and blocked from said last mentioned communicating when said second valving member is in said second position.

5. The metering valve of claim 4 wherein said housing includes a fuel return port and wherein said logic means includes:

a first fuel dump passage communicating at one end with said return port and communicating at another end with said first transfer passage when said first valving member is in said first position and blocked from said last mentioned communication when said first valving member is in said second position; and a second fuel dump passage communicating at one end with said return port and communicating at another end with said second transfer passage when said second valving member is in said second position and blocked from said last mentioned communication when said second valving member is in said first position.

6. The metering valve of claim 5, further including:

check means allowing fluid flow from the metering passage defined by said first valving member to said outlet and preventing reversed fluid flow;

means for communicating the metering passage defined by each valving member with said return port in response to the respective valving member moving to said second position.

7. The metering valve of claim 6, further including:

means for varying the point at which the metering passage defined by said second valving member is communicated with said return port while said first valving member is moving from said first position to said second position.

8. The fuel metering valve of claim 5 wherein said valving assemblies each include a bore defined by said housing means, said valving members are spool valving members in slideable sealing contact with the walls of said bores, and said spools move axially between said first and second positions.

9. The fuel metering valve of claim 6, wherein said valving assemblies each include a solenoid for moving the spool axially in one direction and a resilient means for moving the spool axially in the other direction.

10. The metering valve of claim 9, wherein said metering means further include:

means for communicating said outlet with said return port at some point while said valving member is moving between said first and second positions; and means for varying the point at which said outlet is communicated with said return port.

11. The metering valve of claim 5, wherein said valve assemblies each include a bore defined by said housing, said valving members are spool valving members disposed in said bores for axial movement between said first and second positions, said metering passages defined by said spool valving members are spool metering passages, and wherein:

each metering means further includes first and second lands defined by said spool and spaced apart by said spool metering passage, said second land having a shoulder spaced from said spool metering passage, a first metering passage defined by said housing, said passage communicating at one end with said outlet, blocked for communication at another end with said spool metering passage by said first and second lands when said spool is in said first and second positions, respectively, and communicated at said another end with said spool metering passage when said spool is moving between said first and second positions, and a second metering passage defined by said housing, said passage communicating at one end with said outlet and said one end of said first metering passage, blocked from communication at another end with said return passage by said second land when said spool is in said first position, and communicated with said return passage by traversing said shoulder across said another end of said second metering passage in response to movement of said spool from said first position to said second position; and check means interposed said outlet and said one ends of said first and second metering passages associated with first valve member, said check means operative to allow fluid flow from said first valve assembly to said outlet and prevent reverse flow.

12. The metering valve of claim 11, wherein said shoulder is diagonal with respect to the axis of said spool and wherein at least said second valve assembly includes:

means for rotating said second spool valving member in its respective bore to vary the relationships between said diagonal shoulder and said another end of said second metering passage, thereby varying the point at which said diagonal shoulder traverses said another end of said second metering passage.

13. A dual metering valve for a pilot fuel injection system of the type including a source of pressurized fuel, a nozzle for delivering the fuel to a piston cylinder of an internal combustion engine, and means for actuating said dual valve in a timed relation to the engine, said dual valve comprising:

housing means having a fuel inlet connected to said source and a fuel outlet connected to said nozzle;

pilot and main valve assemblies disposed in said housing and each including a valving member movable between first and second positions in response to signals from said actuating means, and metering means including a metering passage defined by the valving member and movable therewith for metering fluid from said inlet to said outlet when the valving member is moving between said first and second positions, said metering passages blocked from communication with said outlet when the valving member is in said first and second positions; and logic means for controlling fluid communication between said inlet and the metering passages defined by the pilot and main valving members of said pilot and main valve assemblies, respectively, said logic means including a first logic passage defined by said pilot valving member and movable therewith, said pilot valving member operative to block communication between said inlet and said metering passage defined by said main valving member when in said first position and communicate said inlet and metering passage via said logic passage when in said second position, and a second logic passage defined by said main valving member and movable therewith, said main valving member operative to communicate said inlet and said metering passage defined by said first valving member via said second logic passage when in said first position and block communication when in said second position.

14. The metering valve of claim 13, wherein said logic means further includes:

a first transfer passage communicating at one end with the metering passage defined by said main valving member and communicating at another end with said inlet passage via said first logic passage when said pilot valving member is in said second position and blocked from said last mentioned communicating when said pilot valving member is in said first position; and a second transfer passage communicating at one end with the metering passage defined by said pilot valving member and communicating at another end with said inlet passage via said second logic passage when said main valving member is in said first position and blocked from said last mentioned communicating when said main valving member is in said second position.

15. The metering valve of claim 14 wherein said housing includes a fuel return port and wherein said logic means includes:

a first fuel dump passage communicating at one end with said return port and communicating at another end with said first transfer passage when said pilot valving member is in said first position and blocked from said last mentioned communication when said pilot valving member is in said second position; and a second fuel dump passage communicating at one end with said return port and communicating at another end with said second transfer passage when said main valving member is in said second position and blocked from said last mentioned communication when said main valving member is in said first position.

16. The metering valve of claim 15, further including:

check means allowing fluid flow from the metering passage defined by said pilot valving member to said outlet and preventing reversed fluid flow;

means for communicating the metering passage defined by each valving member with said return port in response to the respective valving member moving to said second position.

17. The metering valve of claim 16, wherein said system includes throttle means and said fuel valve further including:

means responsive to the position of said throttle for varying the point at which the metering passage defined by said second valving member is communicated with said return port while said first valving member is moving from said first position to said second position.

18. The fuel metering valve of claim 15 wherein said valving assemblies each include a bore defined by said housing means, said valving members are spool valving members in slideable sealing contact with the walls of said bores, and said spools move axially between said first and second positions.

19. The fuel metering valve of claim 16, wherein said valving assemblies each include a solenoid for moving the spool axially in one direction and a resilient means for moving the spool axially in the other direction.

20. The metering valve of claim 19, wherein said system includes throttle means and said metering means further include:

means for communicating said outlet with said return port at some point while said valving member is moving between said first and second positions; and means responsive to the position of said throttle for varying the point at which said outlet is communicated with said return port.

21. The metering valve of claim 15, wherein said valve assemblies each include a bore defined by said housing, said valving members are spool valving members disposed in said bores for axial movement between said first and second positions, said metering passages defined by said spool valving members are spool metering passages, and wherein:

each metering means further includes first and second lands defined by said spool and spaced apart by said spool metering passage, said second land having a shoulder spaced from said spool metering passage, a first metering passage defined by said housing, said passage communicating at one end with said outlet, blocked for communication at another end with said spool metering passage by said first and second lands when said spool is in said first and second positions, respectively, and communicated at said another end with said spool metering passage when said spool is moving between said first and second positions, and a second metering passage defined by said housing, said passage communicating at one end with said outlet and said one end of said first metering passage, blocked from communication at another end with said return passage by said second land when said spool is in said first position, and communicated with said return passage by traversing said shoulder across said another end of said second metering passage in response to movement of said spool from said first position to said second position; and check means interposed said outlet and said one ends of said first and second metering passages associated with first valve member, said check means operative to allow fluid flow from said first valve assembly to said outlet and prevent reverse flow.

22. The metering valve of claim 21, wherein said system includes throttle means and said shoulder is diagonal with respect to the axis of said spool and wherein at least said second valve assembly includes:

means responsive to the position of said throttle for rotating said second spool valving member in its respective bore to vary the relationship between said diagonal shoulder and said another end of said second metering passage, thereby varying the point at which said diagonal shoulder traverses said another end of said second metering passage.

* * * * *

UNITED STATES PATENT AND TRADEMARK OFFICE

CERTIFICATE OF CORRECTION

PATENT NO. : 4,033,301

DATED : 7/5/77

INVENTOR(S) : Erlen B. Walton

It is certified that error appears in the above-identified patent and that said Letters Patent are hereby corrected as shown below:

In the Abstract, line 21: "whent he" should read---when the---.

Col. 2, line 36: After "has four" insert---external fuel ports consisting of inlet ports 18a and 18b (18b is shown only in FIGURE 2), an outlet port 20, and a return------.

Signed and Sealed this

*First* Day of *November 1977*

[SEAL]

*Attest:*

RUTH C. MASON
*Attesting Officer*

LUTRELLE F. PARKER
*Acting Commissioner of Patents and Trademarks*